United States Patent
Fujimura

(10) Patent No.: US 6,754,649 B2
(45) Date of Patent: Jun. 22, 2004

(54) APPARATUS AND METHOD FOR STORING DATA IN A STORAGE MEDIUM, WHILE SAVING STORAGE AREAS WHICH ARE USED FOR HOLDING A DATA PATH NAME AND BECOME NECESSARY IN RESPONSE TO THE STORING OF DATA

(75) Inventor: Kazuya Fujimura, Ikoma (JP)

(73) Assignee: Matsushita Electric Industrial Co., Ltd., Osaka-Fu (JP)

( * ) Notice: Subject to any disclaimer, the term of this patent is extended or adjusted under 35 U.S.C. 154(b) by 254 days.

(21) Appl. No.: 09/980,782

(22) PCT Filed: Apr. 18, 2001

(86) PCT No.: PCT/JP01/03313

§ 371 (c)(1),
(2), (4) Date: Dec. 6, 2001

(87) PCT Pub. No.: WO01/80557

PCT Pub. Date: Oct. 25, 2001

(65) Prior Publication Data

US 2002/0156986 A1 Oct. 24, 2002

(30) Foreign Application Priority Data

Apr. 18, 2000 (JP) .................................... 2000-116058
Oct. 18, 2000 (JP) .................................... 2000-318512

(51) Int. Cl.[7] .......................... G06F 17/30; G06F 12/00
(52) U.S. Cl. ........................... 707/1; 711/200; 711/220
(58) Field of Search .............................. 711/200, 220; 707/1

(56) References Cited

U.S. PATENT DOCUMENTS

| | | | | |
|---|---|---|---|---|
| 4,947,265 A | * | 8/1990 | Hayashi et al. | ............... 386/96 |
| 6,192,191 B1 | * | 2/2001 | Suga et al. | ................. 386/120 |
| 2002/0031332 A1 | * | 3/2002 | Ando et al. | .................... 386/46 |

FOREIGN PATENT DOCUMENTS

| | | | |
|---|---|---|---|
| JP | 04-338844 | | 11/1992 |
| JP | 6-319103 | | 11/1994 |
| JP | 09-098367 | * | 4/1997 |
| JP | 09-102922 | * | 4/1997 |
| JP | 2000-187607 | | 7/2000 |

* cited by examiner

Primary Examiner—Glenn Gossage
(74) Attorney, Agent, or Firm—Wenderoth, Lind & Ponack, L.L.P.

(57) ABSTRACT

An apparatus and method for storing and retrieving data files from a storage medium are disclosed. A storage medium stores one or more data files and address information showing the path of each data file. The address information is characterized in that numerical values derived or converted from given parts of the path names are used as the address information, whereby a data configuration which occupies less memory space than storing the path names as character strings. A numerical value can be designated from the numerical values and a character string can be generated from the numerical value to retrieve a corresponding data file.

9 Claims, 12 Drawing Sheets

APPARATUS AND METHOD FOR STORING DATA IN A STORAGE MEDIUM, WHILE SAVING STORAGE AREAS WHICH ARE USED FOR HOLDING A DATA PATH NAME AND BECOME NECESSARY IN RESPONSE TO THE STORING OF DATA

TECHNICAL FIELD

The present invention relates to a technique for recording data that is associated to other data held in a storage medium. More particularly the present invention relates to a technique for reducing the volume of data in the storage medium.

BACKGROUND ART

Conventionally, to edit video or audio recorded by, for example, a video tape recorder VTR camera, video and audio data must first be recorded from the original video tape to a randomly accessible medium in a computer, such as a hard disk or DVD, and editing performed on this data using various applications.

The following is an explanation of the conventional editing methods for video data and audio data, with editing on a personal computer as an example.

Seen from the standpoint of data editing, the personal computer uses a) an interface unit, for receiving video data and audio data from outside, b) a storage unit, comprising a hard disk or the like for holding video data and audio data, c) a data holding unit, for holding video data and audio data received from the interface unit in the storage unit, d) a data obtaining unit, for obtaining data to be reproduced from the storage unit, e) a cathode ray table (CRT) for displaying video data obtained by the data obtaining unit, and f) a speaker for outputting audio data obtained by the data obtaining unit.

(1) Operation of each unit involved in recording video data and audio data.

The interface unit receives video data and audio data from outside and outputs them to the data holding unit.

The data holding unit, upon receiving video data and audio data, performs analog to digital conversion and assigns a unique pathname to each data. Each path name comprises a file name (e.g., "MOV0002" and "AUD0002"), which includes two codes, (a) a four-digit number associating the video and audio data as a set (e.g., "0002"), and (b) letters classifying the data as video or audio (e.g., "MOV" for video and "AUD" for audio). The path names are stored in the storage unit and mapped in the management file "LIST_MGR" in the "MGR_INFO" directory of the storage unit.

The management file "LIST_MGR" holds index data, which shows association of the data held in the storage unit to data generated by editing.

(2) Operation of each unit involved in normal reproduction.

The data obtaining unit obtains the path name, e.g., a path name including "MOV0002" or "AUD0002", of data to be reproduced from the management file "LIST_MGR," obtains the video data and audio data associated with the path name, performs digital to analog conversion, and outputs the video data and audio data to the CRT and speaker, respectively, in parallel.

The CRT and speaker output, respectively, the video and audio represented by the data received from the data obtaining unit.

(3) Operation of each unit involved in data editing.

The following explanation uses an example of data editing involving after-recording, wherein music, narration or other audio is substituted for the audio data which was recorded and is held together with the video data in the storage unit.

When after-recording editing is performed, the data holding unit receives the music, narration or other audio data from the interface unit, converts the data from analog to digital form, and designates a path name (hereinafter "after-recording path name"), including a file name (e.g., "AUD0006", wherein "AUD" indicates audio data). The data holding unit then stores the after-recording path name in the storage unit, and maps the after-recording path name to the to-be-edited video data and audio data in the "LIST_MGR" management file.

When data is to be reproduced, the data obtaining unit refers to the index data in the "LIST_MGR" management file to determine if the data to be reproduced has been after-edited. When association to an after-recording path name is found, the data obtaining unit obtains (a) the video data, and (b) the audio data which is associated with the video data and has an after-recording pathname. The data obtaining unit converts these data from digital to analog, and sends them to the CRT and speaker.

The CRT and speaker receive, respectively, the video data and audio data from the data obtaining unit and output video and audio.

FIG. 1 shows the logical structure of the data in the storage unit, in a case where conventional after-recording editing has been performed.

Data files holding video data and audio data are stored under a directory that has "PRG" followed by a four-digit number in its name (for example, "PRG0001" in the path name "D:¥PRG0001¥MOV001.MOD" in FIG. 1).

Recently, VTR cameras, mobile telephones, mobile music players and other portable devices use as a storage unit next-generation memory cards, such as SD (secure digital) cards, which are lightweight and removable/exchangeable.

These next-generation memory cards use the same storage configuration, i.e., a hierarchy of directories and files, as computer operating systems. Although their data capacity (around 64 megabytes) is small compared with a personal computer's hard disk, the easy exchange of data among these portable devices and with personal computers accounts for the high interest shown in the cards.

By connecting a memory card to the above computer interface unit, data editing is easily accomplished. In addition, some types of portable devices are equipped with functional units similar to a computer, including a storage unit, a data holding unit, and a data obtaining unit, allowing data editing on the portable device.

However, this conventional technology is accompanied by the following problem. As data editing, such as after-recording, is performed on the portable device, the volume of the management file in the memory card swells, creating stress on the limited memory capacity of the card.

SUMMARY OF THE INVENTION

It is therefore an objective of the present invention to provide, for a device with limited memory, (1) a data obtaining apparatus and a data holding apparatus, which limit the increase in data volume due to data editing, (2) a storage medium, which can store the same data as the prior art but more compactly, (3) a data obtaining method, for retrieving data from the storage medium, and (4) a data holding method, for storing data in the storage medium.

In order to achieve the stated objective, the present invention includes a storage medium storing one or more data files and address information showing a path of each data file, characterized in that the address information is denoted as a numerical value, which is derived from a given partial notation of a name of the path, and a data size of the numerical value is smaller than a data size of a character string denoting the same address information.

By using short numerical notations, the size of the data is reduced, saving storage capacity in the memory card.

Further, when the storage medium may store a plurality of data files, which are assigned to a plurality of groups, the path name may include a type 1 notation identifying a group and a type 2 notation identifying a data file within the group, the partial notation may include the type 1 notation, and the path name may be derived from the numerical value by a given reversible operation.

With this arrangement, the original path name can be found from the partial notation, by reversing the operation.

Additionally, when a group includes a plurality of data files that hold different kinds of data, the type 2 notation may indicate which kind of data.

With this construction, even data of different kinds can be converted into the same notation, in the case where both path names include the same type 1 notation, i.e., both sets of data belong to the same group.

Additionally, the kinds of data may be video and audio.

With this construction, video data and audio data belonging to the same group can be converted into the same notation.

Additionally, the storage medium, when a group includes a first audio data file and a first video data file, and a second audio data file is associated to the group, may store a first numerical value, derived from the path names of the first audio data file and the first video data file by the given reversible operation, with an added flag showing the association of the second audio data file, and the path name of the second audio file may be derived by adding a given notation to the first numerical value.

With this construction, address information for the first audio data file and first video data file, which are assigned to the same group, as well as for the second audio data file, which is associated to the other two data files, can all be generated from the above numerical value.

Additionally, when a group includes a first audio data file and a first video data file, and a second audio data file is associated to the group, the storage medium may store a first numerical value, which is derived from the path names of the first audio data file and the first video data file by the given operation, and a second numerical value, which is derived from the path name of the second audio data file by the given operation and associated to the first numerical value.

With this construction, address information for the first audio data file and the first video data file can be generated from the above first numerical value. Also, address information for the second audio data file, which is associated to the other two data files, can be generated from the second numerical value. This allows a reduction in data volume as compared with storing the original path name.

Additionally, data in the first audio data file and data in the first video data file may be recorded in parallel, and the data in the second audio data file may be after-recording data to replace the data in the first audio data file.

With this construction, the volume of data for associating the after-recording data to the video data can be reduced.

Additionally, when the path name is composed of a string of characters, and a character representing a base n number (where n is an integer greater than one) is included in the given partial notation in the string, the given reversible operation may convert the character into a base n numerical value (where n is an integer greater than one).

With this construction, the above given operation can be performed by a simple mathematical operation, simplifying the structure of the processing apparatus.

Additionally, the data files may be stored in logically hierarchical locations; each path name may include a name of a directory, which indicates a location in the hierarchy and contains a plurality of data files, and a group name, which indicates the group; the given partial notations may be characters corresponding to the notations showing the base n numbers (where n is an integer greater than one) of the directory names and group names; and the given operation may link the two numerical values obtained by the conversion performed on the characters from the directory name and group name of each path name.

With this construction, address information showing the directory name and group name can be generated from the above numerical values.

Additionally, the base n number may be a hexadecimal number.

With this construction, the space needed for storing the above numerical values can be reduced, reducing the memory capacity of the storage medium.

Additionally, a data obtaining apparatus according to the present invention, which retrieves a desired data file from the storage medium, is characterized by (1) a numerical value designating unit, which designates, from among a plurality of numerical values held in the storage medium, a numerical value corresponding to a data file to be retrieved; (2) a path name generating unit, which generates a path name for a given character string, by performing a given operation to combine a given character string with a character string converted from a numerical value that is designated by the numerical value designating unit; and (3) an obtaining unit, which, if there is a data file with a path name generated by the path name generating unit in the storage medium, retrieves the data file. Similarly, a data obtaining method of the present invention, for retrieving a desired data file from the storage medium, is characterized by: (1) a numerical value designating step, in which a numerical value, from among a plurality of numerical values stored in the storage medium, is designated as corresponding to a data file to be retrieved; (2) a path name generating step, in which a path name is generated for the given character string, by performing a given operation to combine a given character string with the character string that is converted from a numerical value designated in the numerical value designating step for the character string; and (3) an obtaining step, in which, if there is a data file with a path name generated by the path name generating unit in the storage medium, the data file is retrieved.

With this construction, using a numerical value whose data size is smaller than that of the path name, the path name of the data file to be obtained can be generated, and the data file can be retrieved, if it exists.

Additionally, the path name generating unit may generate a path name for each of the plurality of different given character strings.

With this construction, a plurality of path names can be generated from one numerical value stored in the storage medium, and a plurality of data files can be retrieved, thereby reducing the volume of data stored in the storage medium compared with storing a plurality of path names as character strings.

Additionally, a numerical value designated by the numerical value designating unit may be a base n numerical value (where n is an integer greater than one), and the given operation may perform the combination by inserting a character corresponding to the numerical value into each given position in the given generated character string.

With this construction, because the generated path name includes characters for the numerical values stored in the storage medium, the relationship between the path name and the numerical value can be easily inferred from their notations.

Additionally, the numerical value designating unit, when a first numerical value, one of a plurality held in the storage medium, is associated to a distinct second numerical value, may designate the first and second numerical values as corresponding to a data file to be retrieved, and the obtaining unit may retrieve a data file whose path name is generated from the second numerical value and includes a given first character string, in place of a data file whose path name is generated from a first numerical value and includes a given first character string.

With this construction, because associative information is stored as numerical values, whose data size is small, the volume of data stored in the storage medium can be reduced, as compared with association by path names.

Additionally, a flag showing a first value or a distinct second value may be attached to a numerical value held in the storage medium; a plurality of character strings generated by the path name generating unit may include a first character string; the path name generating unit, when the flag that is attached to the numerical value designated by the numerical value designating unit is the second value, may generate a second character string, distinct from the first character string; and the obtaining unit may retrieve a data file whose path name includes the given second character string, in place of a data file whose path name includes the first character string.

With this construction, association is made by a flag attached to the numerical value, whose data size is small, reducing the volume of data to be stored in the storage medium as compared with making association by path names.

Additionally, the second character string may be the first character string with one or more given characters deleted or changed.

With this construction, the relationship between the path name and the numerical value is easily deduced from their notations.

Additionally, the data holding apparatus of the present invention, of a type which has a data obtaining unit for retrieving data files and a path allocating unit for generating and allocating a path name for a retrieved data file and which stores a data file in a storage medium, is characterized by: (1) a numerical value generating unit, which performs a given operation to generate, as address information corresponding to the path name, a numerical value, whose data size is smaller than that of the path name, from a given partial notation that is part of the path name; and (2) a holding unit, which stores the numerical value and the data file, associated to the path name identifying a location of each data file in the storage medium. Similarly, a data holding method of the present invention, of a type which has a data obtaining step for retrieving data files and a path allocating step for generating and allocating a path name for a retrieved data file and which stores a data file in a storage medium, is characterized by: (1) a numerical value generating step, in which a numerical value, whose data size is smaller than that of the path name, is generated, as address information corresponding to the path name, from a given partial notation that is part of the path name; and (2) a holding step, in which the numerical value and the data file are stored in the storage medium, associated to the path name identifying a location of the data file in the storage medium.

With this construction, address information corresponding to the path name is stored in the storage medium as numerical values, whose data size is smaller than the original path names, resulting in a reduction in the volume of data in the storage medium.

Additionally, the path allocating unit may link two character strings showing a directory name and a file name that are used for data management, to generate the path name of the retrieved data file; the character string showing the directory name may be composed of a unique character string and a base n (where n is an integer greater than one) first numeral string; the character string showing the file name may be composed of a given character string, which shows the type of file, and a base n (where n is an integer greater than one) second numeral string; and the numerical value generating unit may generate the numerical values by using the first and second numeral strings as the given partial notation and linking the numerical values obtained therefrom.

With this construction, the numerical value generated as address information bears closer resemblance to the path name.

DETAILED DESCRIPTION OF THE INVENTION

First Embodiment

Figure 1:
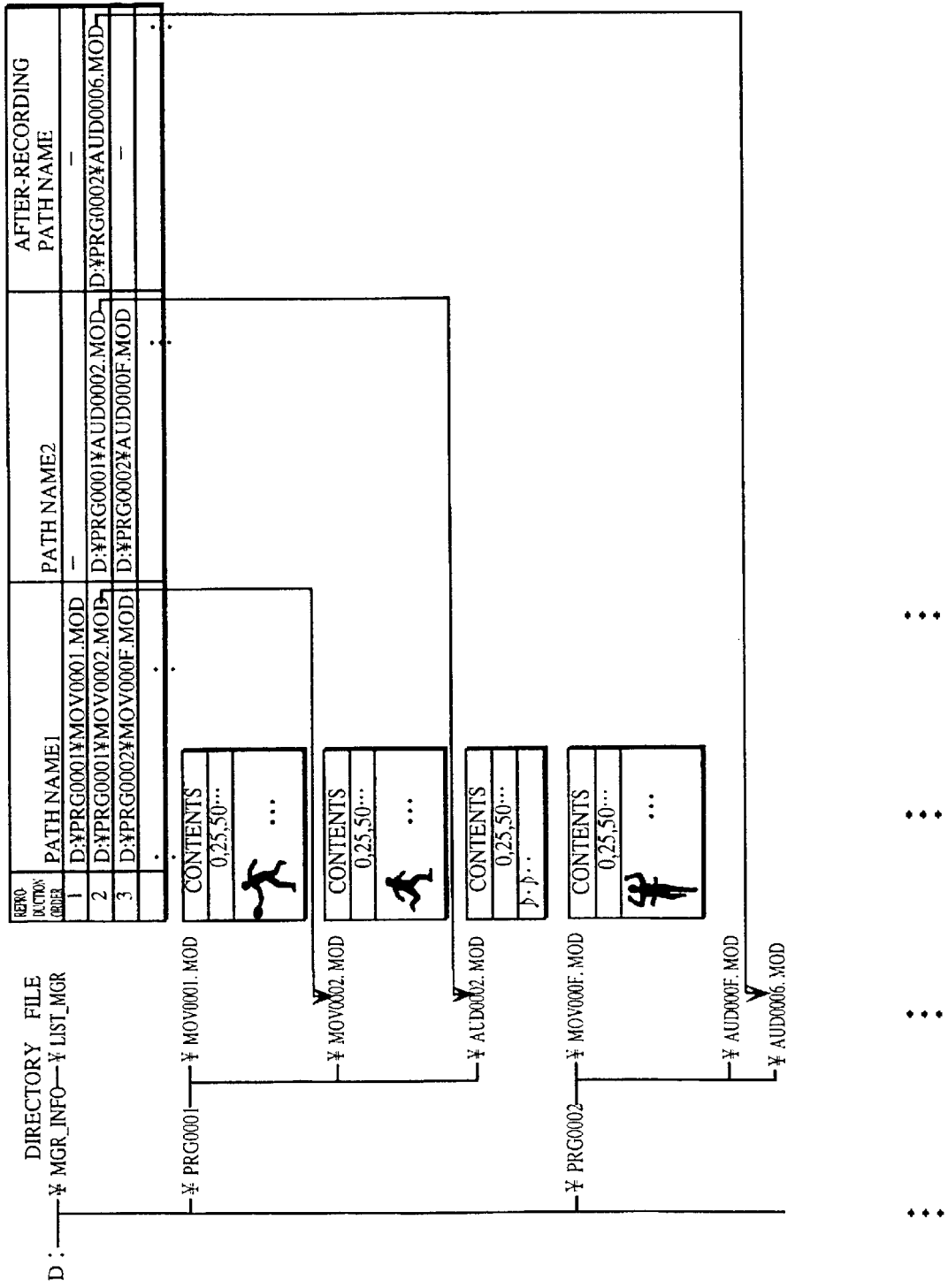
FIG. 1 shows the logical structure of the data in the storage unit when after-recording editing has been performed by conventional means.
Figure 2:
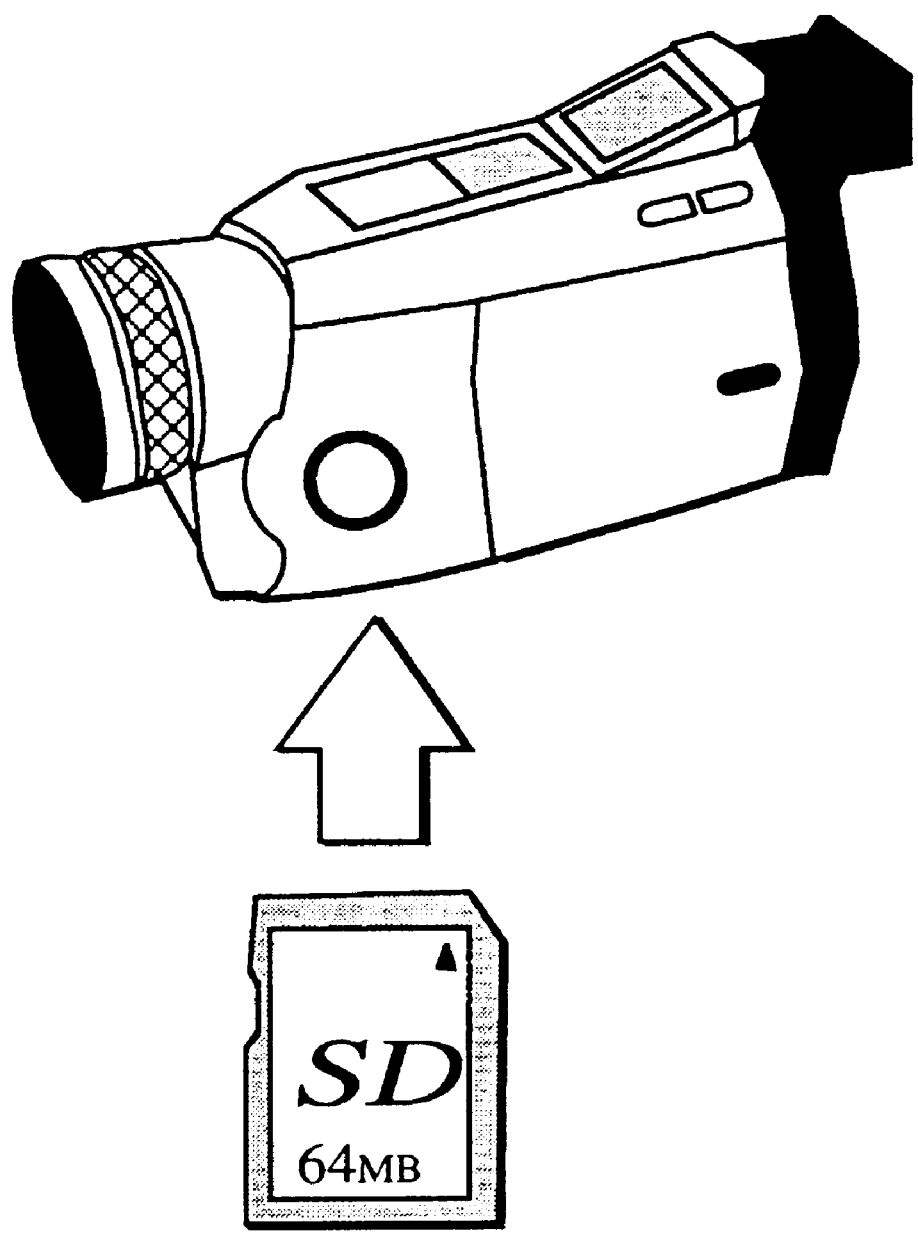
FIG. 2 is an external view of the VTR camera using the storage medium, data obtaining apparatus, and data holding apparatus, according to a first embodiment of the present invention.

FIG. 2 is an external view of the VTR camera using the storage medium, data obtaining apparatus, and data holding apparatus according to the first embodiment of the present invention.

This VTR camera is a digital VTR camera supporting the SD card, having an SD card interface and operable to store recorded video data and audio data on a videotape or SD card.

Below, since the present invention does not involve recording video data and audio data to a videotape, only an SD card is inserted into the devices, and all captured video data and audio data is stored to an SD card.

Figure 3:
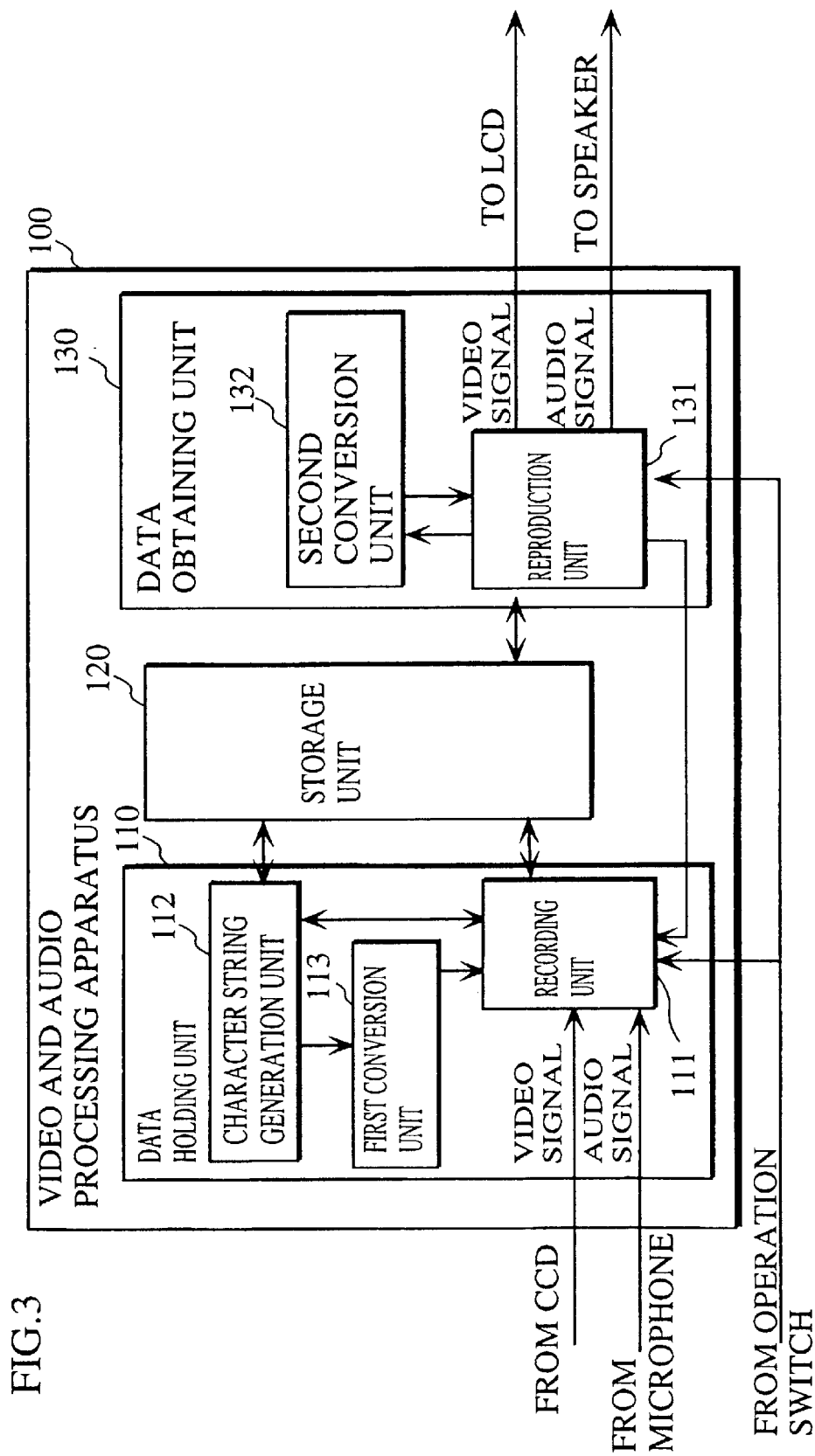
FIG. 3 is a functional block diagram showing the internal structure of the VTR camera.

FIG. 3 is a functional block diagram showing the internal structure of the VTR camera. The VTR camera includes a video and audio processing apparatus (100), which moves data in and out of the storage medium. The VTR also includes, although not shown, a charge-coupled device (CCD), a microphone, an operation switch, which receives commands from the operator, an LCD and a speaker.

The video and audio processing apparatus (100) includes a data holding unit (110), a storage unit (120), and a data obtaining unit (130), which correspond to the data holding apparatus, storage medium, and data obtaining apparatus according to the present invention, respectively.

The data holding unit (110) and data obtaining unit (130) are composed of a central processing unit (CPU) and recording media, such as RAM, ROM, etc. The data holding unit (110) includes a recording unit (111), a character string generation unit (112), and a first conversion unit (113). The data obtaining unit (130) includes a reproduction unit (131) and a second conversion unit (132).

(1) The video and audio processing apparatus (100)

(i) Function of the data holding unit (110)

The recording unit (111), upon receiving video data and audio data from the CCD and microphone, obtains a path name for each from the character string generation unit (112). Upon receiving the path names, the recording unit (111) obtains a numerical value corresponding to each path name from the first conversion unit (113), attaches each path name to the corresponding data and stores them in the storage unit (120). The recording unit (111) also assigns a one bit flag to each numerical value, and stores the numerical values with a flag of an initial value of "0" in the data management file (e.g., path name "D:¥MGR_INFO¥PROG_MGR") in the storage unit (120).

In the path name, "D:" is a drive name indicating an SD card, "MGR_INFO" is the name of the management directory, and "PROG_MGR" is the name of the management file.

The recording unit (111), upon receiving audio data from the microphone for after-recording editing, and a signal from the operation switch, identifies the audio data as for after-recording editing, and receives a specification of the video and audio to undergo after-recording editing. The recording unit (111) then sends the path names corresponding to this video and audio to the character string generation unit (112), and requests a path name for the received after-recording data. Upon receiving a path name from the character string generation unit (112), the recording unit (111) associates the path name to the after-recording data and stores both in the storage unit (120).

When recording audio for after-recording editing, the recording unit (111) receives a synchronous signal from the reproduction unit (131) to synchronize the after-recording data with the edited video data.

When receiving from the recording unit (111) a request for a path name, as described above, related to normal recording not including after-recording, the character string generation unit (112) refers to the data in the storage unit (120), and generates unused path names for the video data and the audio data, e.g., "D:¥PRG0001¥MOV001F.MOD" and "D:¥PRG0001¥AUD001F.MOD".

The ".MOD" at the end of these path names is an extension indicating data to be used by the video and audio processing apparatus (100).

Each path name is a combination of a drive name, a directory name and a file name indicating the location, or path, of data in the structure which forms the data hierarchy. In the above example, "D:" corresponds to the drive name, "PRG0001" to the directory name, and "MOV001F" and "AUD001F" to the file name.

The "¥" symbol in the path name is inserted to indicate the separation between the drive name, directory name and file name.

More specifically, the directory name and file name are each composed of a predetermined character portion and a variable hexadecimal numeral portion. In the above example, the directory name "PRG0001" is composed of the character portion "PRG," which indicates a serially recorded unit, i.e., a program, and the numeral portion "0001," which is a number designated to identify the video and audio data in each program unit.

The file name "MOV001F" includes the character portion "MOV," which indicates video data, while the file name "AUD001F" includes the character portion "AUD," indicating audio data. The numeral portion "001F" of both files is the same, indicating video data and audio data recorded in parallel. The same numerical value is designated to data files of the same group.

When the path name of video data to undergo after-recording editing is specified and a path name is requested for the after-recording data by the recording unit (111), the character string generation unit (112) takes the file name of the specified path name and changes the "MOV" portion to "AU" to generate the path name.

For example, if the above path name "D:¥PRG0001¥MOV001F.MOD" were specified, the path name "D:¥PRG0001¥AU001F.MOD" would be generated.

The first conversion unit (113) generates a numerical value from the path name received from the character string generation unit (112).

Figure 4:
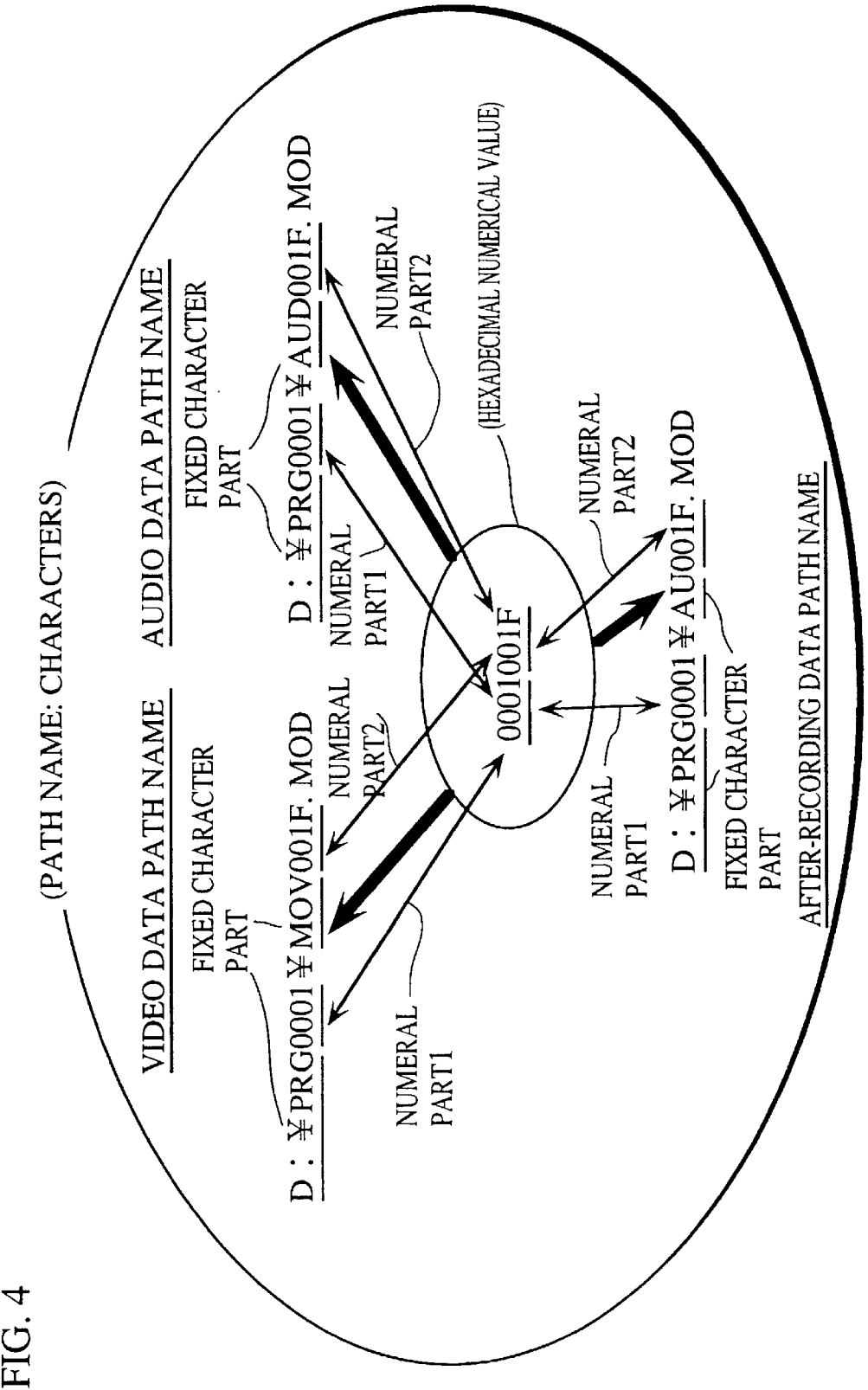
FIG. 4 shows the relationship between the path name received from the character string generation unit and the numerical value generated from the path name by the character string adjustment identifier conversion unit.

FIG. 4 shows the relationship between the path name received from the character string generation unit (112) and the numerical value generated by the first conversion unit (113) from the path name.

For example, if the received path name is "D:¥PRG0001¥AUD001F.MOD", the numeral portion of the directory name (1), and the numeral portion of the file name (2), i.e., "0001" and "001F", are extracted, and linked to generate the numerical value "0001001F".

More specifically, the notation indicated by the numeral portion (1) and numeral portion (2) of the path name "D:¥PRG0001¥AUD001F.MOD", i.e., "0001" and "001F", are, precisely, recognized as letters for file management. When linking them to generate "0001001F", the first conversion unit (113) converts the letters to an eight digit hexadecimal number, generating the four byte integer "0001001F".

By executing this kind of operation, the first conversion unit (113) generates a numerical value from a path name, and outputs the generated numerical value to the recording unit (111).

Also, as shown in FIG. 4, one numerical value becomes the base for generating a plurality of path names, and a plurality of associated path names becomes the base for generating one numerical value.

The storage unit (120) is an SD card with 64 MB of memory capacity, which stores video data, audio data, and management information for these data. These data are stored in the same configuration as files in a personal computer, with a hierarchy of directories and files.

(ii) The data obtaining unit (130)

When a reproduction command is given by the operation switch, the reproduction unit (131) outputs the path name of the specified data, e.g., "D:¥PRG0001¥MOV001F.MOD" and "D:¥PRG0001¥AUD001F.MOD", to the second conversion unit (132), and receives back a numerical value corresponding to the path name of the specified data, e.g., "0001001F".

Then, the reproduction unit (131) refers to the management file in the storage unit (120) for the same numerical value, "0001001F", and refers to the flag value attached to it.

If the flag value is "0", the reproduction unit (131) recognizes that after-recording editing has not been performed, obtains the data corresponding to the path name of the specified data, e.g., "D:¥PRG0001¥MOV001F.MOD" and "D:¥PRG0001¥AUD001F.MOD", from the storage unit (120), and outputs the video data and audio data, respectively, to the LCD and the speaker, in parallel.

If the flag value is "1", the reproduction unit (131) recognizes that after-recording editing has been performed, and requests the second conversion unit (132) to generate a path name for the after-recording data, based on the numerical value "0001001F" generated above. Then, the reproduction unit (131) receives the after-recording data path name "D:¥PRG0001¥AU001F.MOD", and obtains from the storage unit (120) the data for this path name, i.e., the after-recording data, and video data corresponding to the path name of the data specified for reproduction, "D:¥PRG0001¥MOV001F.MOD", and outputs the video data and audio data, respectively, to the LCD and the speaker, in parallel.

When the signal from the operation switch indicates a command to record audio for after-recording editing, the reproduction unit (131) obtains the video data corresponding to the path name of the video data to undergo after-recording editing, e.g., "D:¥PRG0001¥MOV001F.MOD", from the storage unit (120), outputs the video data to the LCD, and outputs the after-recording data, along with a synchronous signal for synchronizing with the video data, to the recording unit (111).

The second conversion unit (132) receives a pass name from the reproduction unit (131), and, using the operation shown in FIG. 4, generates a numerical value from the path name.

When a numerical value is given by the reproduction unit (131), the second conversion unit (132) generates a path name for the after-recording data from the numerical value, by using the above operation.

More specifically, the second conversion unit (132) converts the eight byte numerical value "0001001F" into characters "0001001F", divides the first four digits "0001" and the last four digits "001F", inserts "AU" between them, and "D:PRG" in front. Further, the divider symbol "¥" is inserted between the drive name, the directory name, and the file name, to complete generation of the after-recording data path name.

(2) Data configuration in the storage unit (120)

Figure 5:
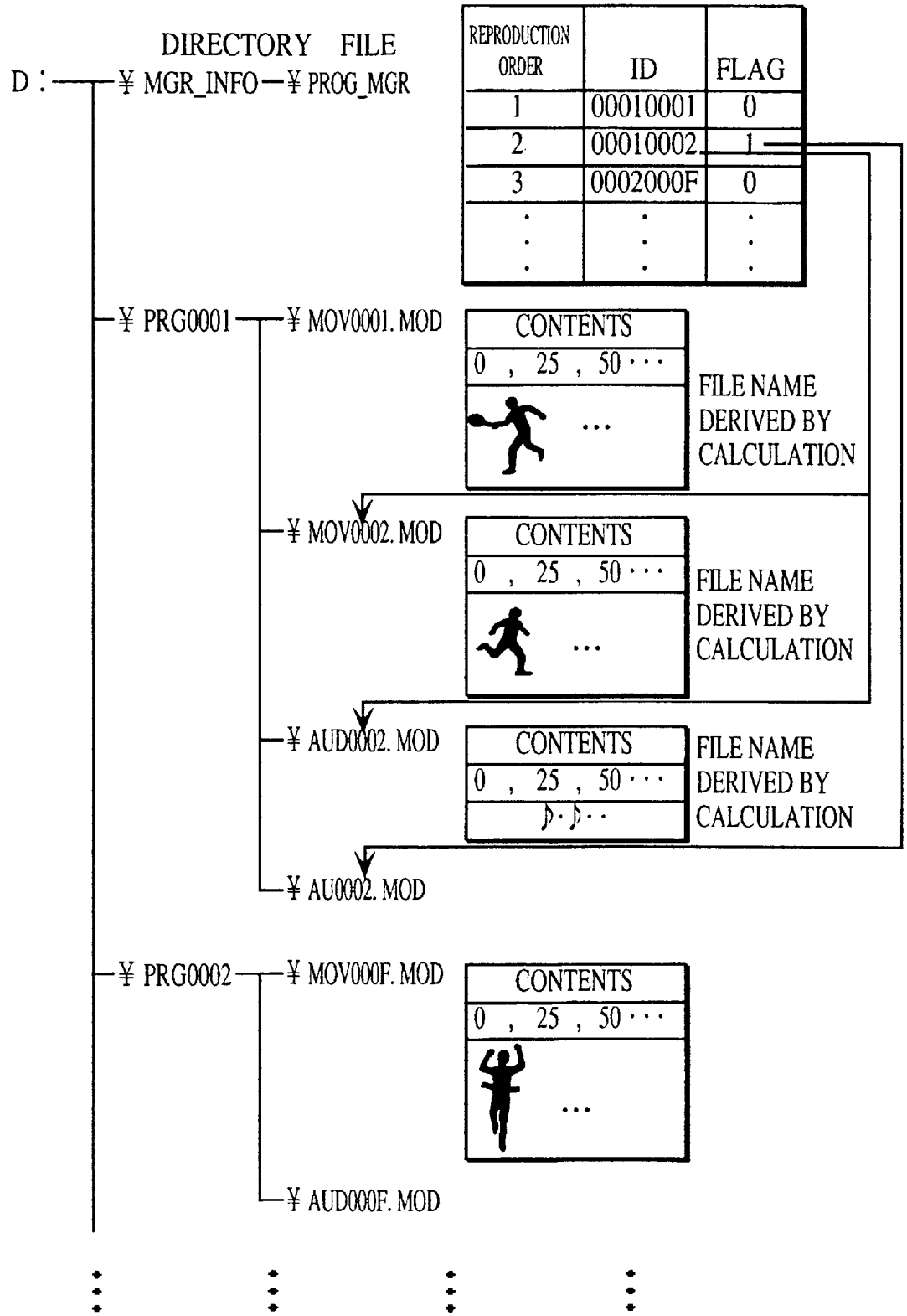
FIG. 5 shows the logical data structure in a storage unit according to the first embodiment.

FIG. 5 shows the logical structure of data in the storage unit (120).

The data management file indicated by the path name "D:¥MGR_INFO¥PROG_MGR" stores identifiers (IDs), i.e., the numerical values described above, for identifying the path of data stored in an SD card, as index information for the data stored in the storage unit (120). Flags, which indicate whether after-recording editing has been performed, are attached to the numerical values.

Contents, video data and audio data, are stored under directories beginning with "PRG". A file containing video data includes "MOV" in its file name, the name of a file containing after-recording data has "AU" followed immediately by numerals, and a file containing other audio data includes "AUD" in its file name.

This data structure and file-naming rules are implemented by processing in the data holding unit (110), and data is stored in the storage unit (120) by the following process.

Figure 6:
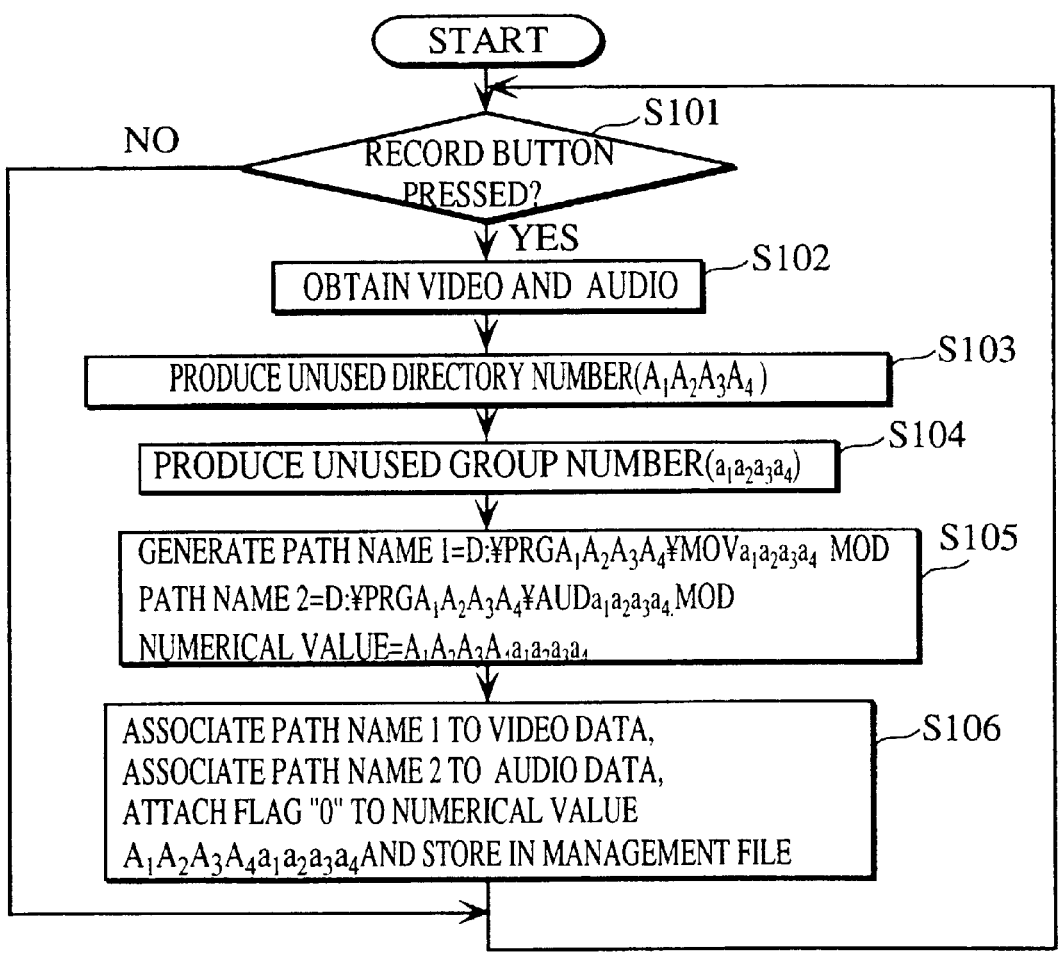
FIG. 6 is a flow chart showing the processing of data stored in the storage unit, i.e., recorded video and audio, in a video and audio processing apparatus according to the first embodiment.

FIG. 6 is a flow chart showing the process in the video and audio processing apparatus (100) for storing data to the storage unit (120), i.e., the process for recording of video and audio data.

The recording unit (111) decides whether recording is indicated by the signal from the operation switch (i.e., whether the record button is pressed) (step S101), and, when recording is indicated, receives video data and audio data input from the CCD and microphone, respectively (step S102). The recording unit (111) then requests a path name for these data from the character string generation unit (112).

According to this request, the character string generation unit (112) refers to the data in the storage unit (120), generates an unused directory number, e.g., $A_1A_2A_3A_4$, and an unused group number, e.g., $a_1a_2a_3a_4$ (steps S103, S104), generates path name 1, "D:¥PRGA$_1$A$_2$A$_3$A$_4$¥MOVa$_1$a$_2$a$_3$a$_4$.MOD", for the video data, and path name 2, "D:¥PRGA$_1$A$_2$A$_3$A$_4$¥AUDa$_1$a$_2$a$_3$a$_4$.MOD", for the audio data. Then, the first conversion unit (113) generates the numerical value "$A_1A_2A_3A_4a_1a_2a_3a_4$" from the path names (step S105).

Then, the recording unit (111) associates path name 1 and path name 2 to the video data and audio data, respectively, and stores them in the storage unit (120). Next, the recording unit (111) attaches a flag with the value "0" to the above numerical value, stores them in the management file in the storage unit (120), i.e., "D:¥MGR_INFO¥PROG_MGR" (step S106), and returns to step S101, to decide whether a recording command was indicated by the recording unit (111).

Figure 7:
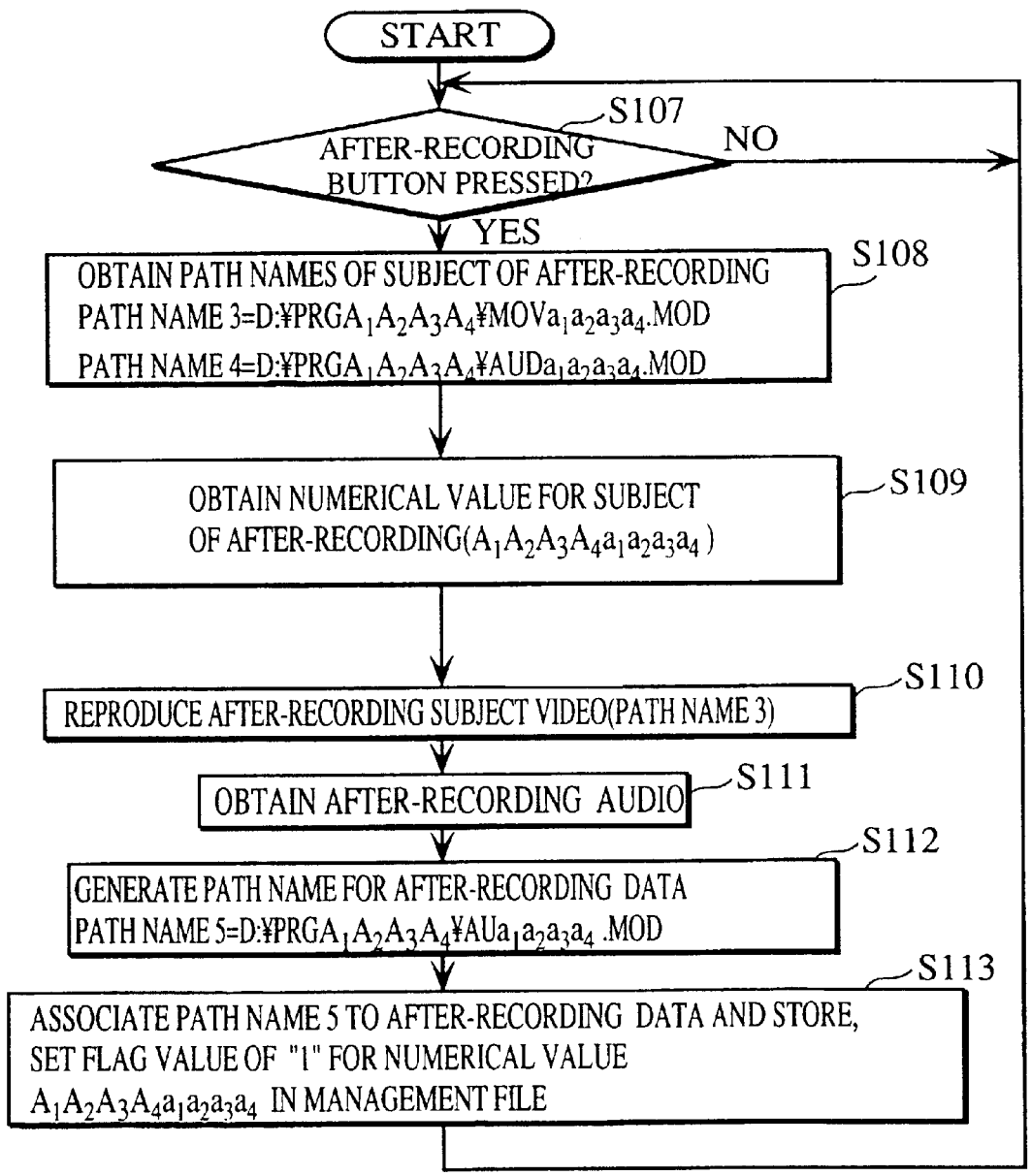
FIG. 7 is a flow chart showing the process for after-recording editing of recorded video and audio according to the first embodiment.

FIG. 7 is a flow chart showing the process for performing after-recording editing on video and audio recorded as above.

The reproduction unit (131), when it recognizes by a signal from the operation switch that after-recording editing has been performed (i.e., after the recording button has been pressed) (step S107), begins the following processing.

The reproduction unit (131) retrieves the path name 3 of the video data that underwent after-recording editing, "D:¥PRGA$_1$A$_2$A$_3$A$_4$¥MOVa$_1$a$_2$a$_3$a$_4$.MOD", and path name 4 of the audio data, "D:¥PRGA$_1$A$_2$A$_3$A$_4$¥AUDa$_1$a$_2$a$_3$a$_4$.MOD" (step S108).

Then, the second conversion unit (132) generates a numerical value, "A$_1$A$_2$A$_3$A$_4$a$_1$a$_2$a$_3$a$_4$", which corresponds to the storage location, i.e., path name 3 and path name 4, of the data that underwent after-recording editing, by using an operation (step S109).

Then, the reproduction unit (131) reproduces the video data of path name 3 (step S110), and the recording unit (111) records the after-recording audio inserted during reproduction of the video data (step S111).

Then, the second conversion unit (132) generates the path name for the after-recording data, i.e., path name 5 "D:¥PRGA$_1$A$_2$A$_3$A$_4$¥AUa$_1$a$_2$a$_3$a$_4$.MOD", based on the above numerical value (step S112), and notifies the recording unit (111) of the path name.

The recording unit (111) associates the recorded after-recording audio to path name 5 and stores it, changes to "1" the value of the flag attached to the above numerical value "A$_1$A$_2$A$_3$A$_4$a$_1$a$_2$a$_3$a$_4$" in the management file in the storage unit (120) (step S113), and returns to the first step (step S107), where the recording unit (111) decides whether after-recording editing was received.

The following is an explanation of the process for retrieving data from the storage unit (120).

Figure 8:
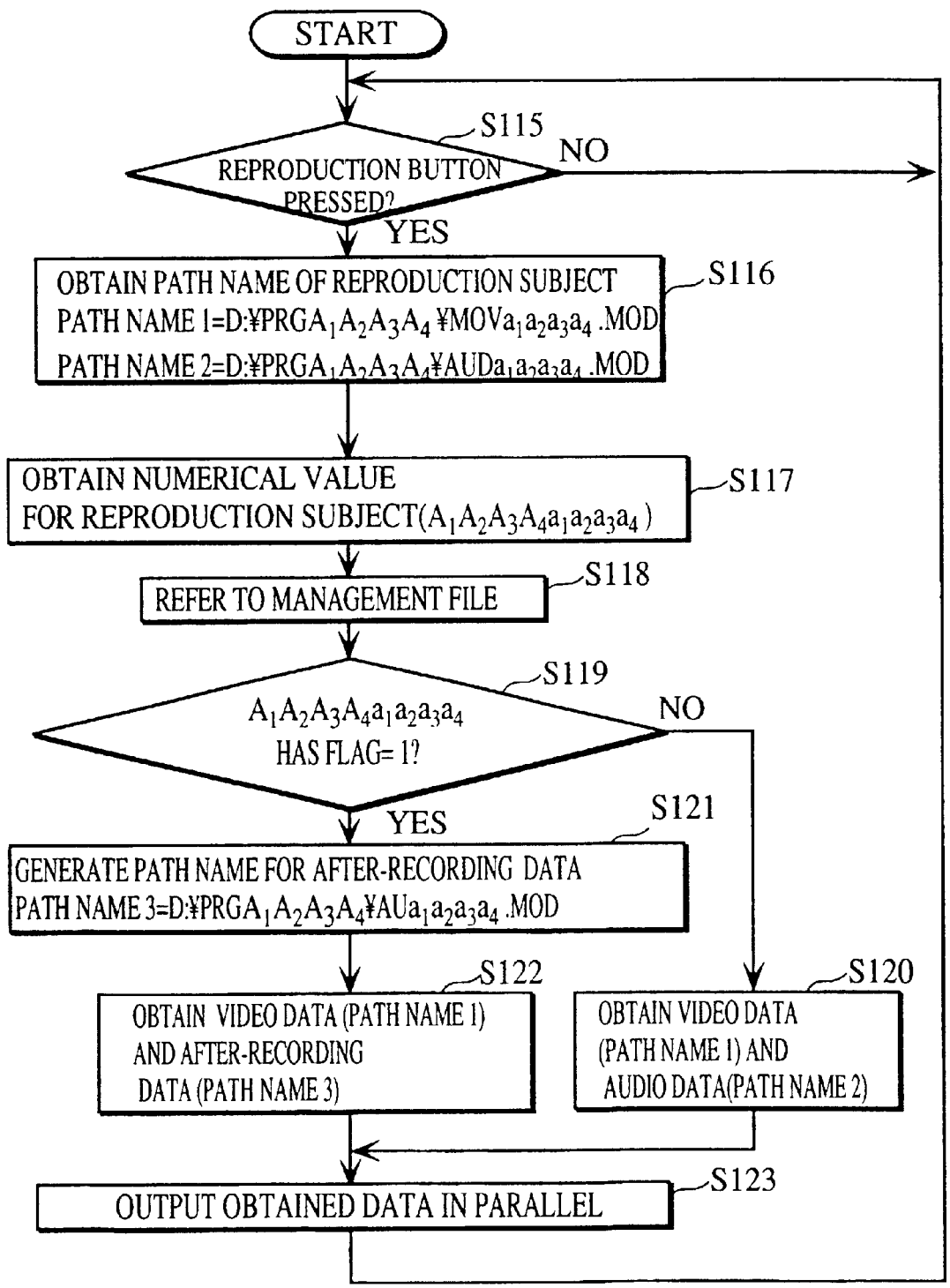
FIG. 8 is a flow chart showing the process for the data obtaining unit to retrieve data from the storage unit, i.e., operations for reproduction, according to the video and audio processing apparatus of the first embodiment.

FIG. 8 is a flow chart showing the process in the video and audio processing apparatus (100) for the data obtaining unit (130) to retrieve data from the storage unit (120), i.e., the operations involved in reproduction.

The reproduction unit (131) decides if are production command has been given by a signal from the operation switch (i.e., whether the reproduction button has been pressed) (step S115). If the command is received, the reproduction unit (131) receives an indication of the path name of the data to be reproduced, e.g., path name 1 "D:¥PRGA$_1$A$_2$A$_3$A$_4$¥MOVa$_1$a$_2$a$_3$a$_4$.MOD" for video data and path name 2 "D:¥PRGA$_1$A$_2$A$_3$A$_4$¥AUDa$_1$a$_2$a$_3$a$_4$.MOD" for audio data (step S116), and outputs these path names to the second conversion unit (132).

The second conversion unit (132) generates a numerical value, "A$_1$A$_2$A$_3$A$_4$a$_1$a$_2$a$_3$a$_4$" for the received path names, and outputs it to the reproduction unit (131) (step S117).

Then, the reproduction unit (131) refers to the management file in the storage unit (120) (step S118), refers to the flag attached to the above numerical value, and decides if the value of the flag is "1" (step S119).

If the value of the flag is not "1", i.e., if after-recording editing has not been performed, the reproduction unit (131) retrieves the video data of path name 1 and audio data of path name 2 from the storage unit (120) (step S120), outputs the video data to the LCD and the audio data to the speaker, in parallel, and returns to the first step (step S115) to decide whether a reproduction command has been given by a signal from the operation switch.

If the value of the flag is "1", i.e., if after-recording editing has been performed, the reproduction unit (131) has the second conversion unit (132) generate path name 3, "D:¥PRGA$_1$A$_2$A$_3$A$_4$¥AUa$_1$a$_2$a$_3$a$_4$.MOD", for the after-recording data, based on the above numerical value (step S121), retrieves the path name, and retrieves the video data of path name 1 and the after-recording data of path name 3 (step S122).

Then, the reproduction unit (131) outputs the video data to the LCD and the audio data or after-recording data to the speaker, in parallel (step S123), and returns to the first step (step S115) to decide whether a reproduction command has been given by a signal from the operation switch.

By the structure and functions described above, a one-bit flag shows whether after-recording editing has been performed on video data and audio data. Further, the path name indicating the location of after-recording data can be generated based on one four-byte numerical value, which in turn is generated from the path names of the video data and audio data that underwent after-recording editing. This numerical value is converted into characters, and pre-determined characters are inserted by an operation, to generate the after-recording data path name. This construction allows a reduction in the volume of information necessary for after-recording.

Second Embodiment

The following is an explanation of the data transmission apparatus of the second embodiment.

In the second embodiment, the storage medium, data obtaining apparatus, and data holding apparatus, i.e., the storage unit (120), data obtaining unit (130), and data holding unit (110), have the same structure as in the first embodiment. The differences are (a) the data content stored in the management file in the storage unit (120), (b) the generation of data stored in this management file, (c) the decision of whether after-recording editing has been performed using the data stored in this management file, and (d) the generation of a path name indicating the location of the after-recording data.

Therefore, omitting the portions which do not differ from the preceding, the following is an explanation of the operation of the storage unit (120), data obtaining unit (130), and data holding unit (110) according to the second embodiment.

The following explains processing in the data holding unit (110).

The recording unit (111), upon receiving video data and audio data from the CCD or microphone, requests and receives a path name for each set of data from the character string generation unit (112), receives a numerical value corresponding to each path name from the first conversion unit (113), attaches the path names to the data, stores the data in the storage unit (120), and stores the numerical values and the path names in the management file created in the storage unit (120).

Flags are not attached to the numerical values in the second embodiment.

The recording unit (111), when it receives only audio data for after-recording editing from the microphone, recognizes that the data received by input from the operation switch is for after-recording editing, receives an indication of the video and audio to undergo after-recording editing, receives path names for the video and audio from the reproduction unit (131), outputs the path names to the character string generation unit (112), and requests a path name and a numerical value corresponding to the audio data received for after-recording editing. As a result, the recording unit (111) receives a path name for the after-recording data from the character string generation unit (112), receives a numerical value corresponding to the path name from the first conversion unit (113), associates the path name to the after-recording data, and stores both in the storage unit (120). Further, the recording unit (111) associates this numerical value to the one numerical value in the management file in the storage unit (120) which corresponds to the video data and audio data that are to undergo after-recording editing.

When a path name for after-recording data is requested by the recording unit (111), the character string generation unit (112) refers to the data in the storage unit (120) and generates an unused path name, e.g., "D:¥PRG0002¥AUD0006.MOD", for the after-recording data.

The path name of after-recording data is generated with no relation to any numerical value corresponding to a path name of the video data and audio data to be edited.

The path name indicates a storage location in the data configuration forming a hierarchy. The path name is a combination of a drive name ("D:" in the above example), a directory name ("PRG0002"), and a file name ("AUD0006").

Next, the character string generation unit (112) outputs the generated path name to the recording unit (111) and the first conversion unit (113).

By following the procedure described above, the data configuration of the management file in the storage unit (120) in the second embodiment differs from that of the first embodiment.

Figure 9:
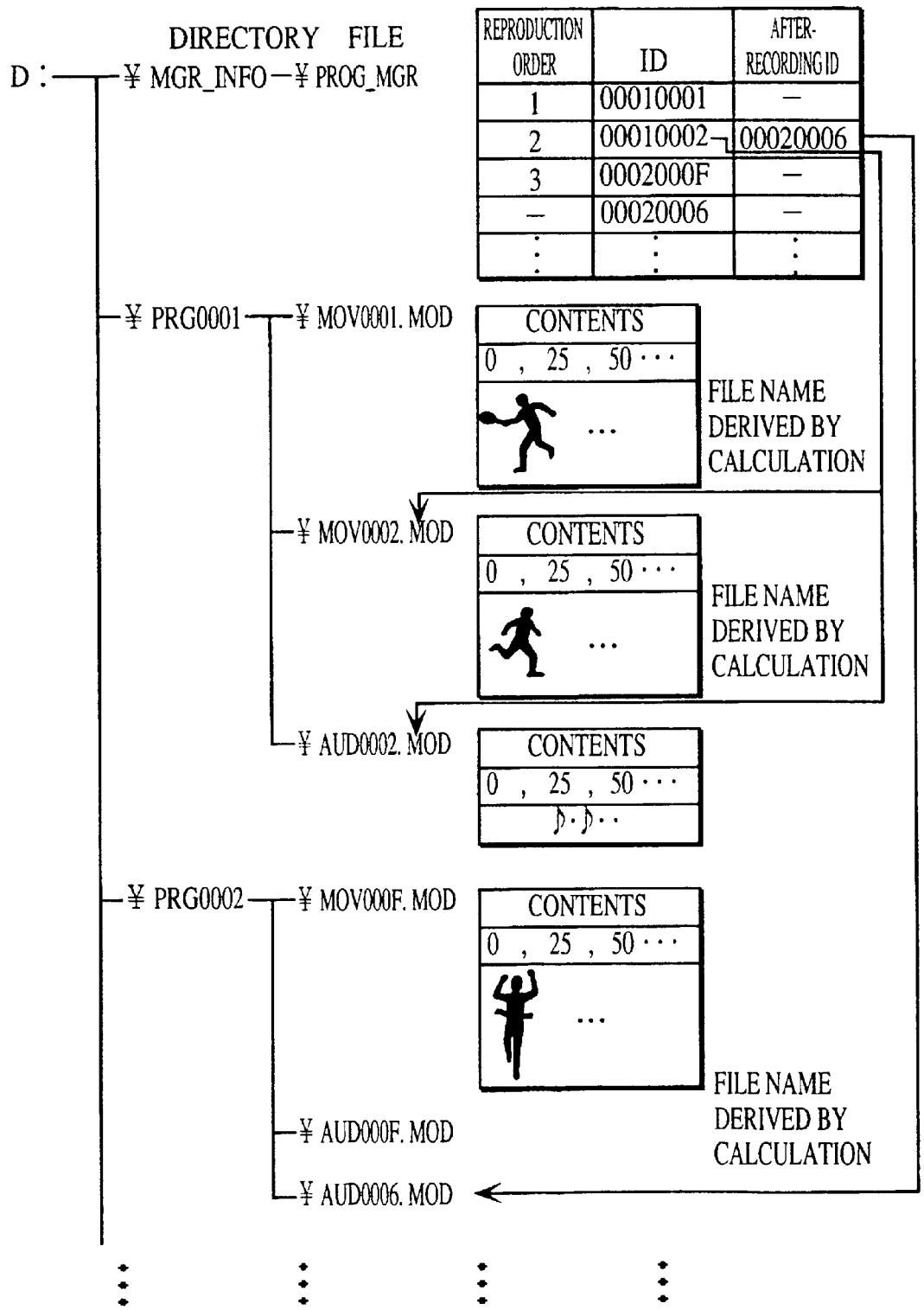
FIG. 9 shows the logical structure of data in the storage unit according to a second embodiment.

FIG. 9 shows the logical configuration of data in the storage unit (120) according to the second embodiment.

In the management file of the storage unit (120), i.e., "D:¥MGR_INFO¥PROG_MGR", when after-recording editing has been performed, instead of a flag as in the first embodiment, a numerical value corresponding to the path name of audio data recorded for after-recording editing, i.e., an after-recording ID, is attached to the numerical value, i.e., ID, which corresponds to the path name of data to undergo after-recording editing. This point, and the after-recording data path name, which includes the characters "AUD", just as all other audio data, are points where the second embodiment differs from the first embodiment.

The following explains the differences from the first embodiment in the data obtaining unit (130).

The reproduction unit (131), when a reproduction command is given by the operation switch, outputs the path name of the data to be reproduced, e.g., "D:¥PRG0001¥MOV0002.MOD" and "D:¥PRG0001¥AUD0002.MOD", to the second conversion unit (132), and receives a numerical value corresponding to the path name, e.g., "00010002", in response from the second conversion unit (132).

The preceding is the same as for the first embodiment.

Next, the reproduction unit (131) refers to the management file in the storage unit (120) for a numerical value equivalent to "00010002", and determines if this numerical value has another numerical value, i.e., an after-recording ID, attached to it.

If there is no after-recording ID attached, the reproduction unit (131) recognizes that after-recording editing has not been performed, retrieves data corresponding to the path name of the data to be reproduced, i.e., "D:¥PRG0001¥MOV0002.MOD" and "D:¥PRG0001¥AUD0002.MOD", from the storage unit (120), and outputs video data and audio data to the LCD and the speaker, respectively, in parallel.

If there is an after-recording ID attached, the reproduction unit (131) recognizes that after-recording editing has been performed, directs the second conversion unit (132) to generate an after-recording data path name based on the attached numerical value, e.g., "00020006", receives the path name "D:¥PRG0002¥AUD0006.MOD" in response from the second conversion unit (132), retrieves the after-recording data for this path name, and the video data for the path name for which the reproduction command was given, i.e., "D:¥PRG0001¥MOV0002.MOD", from the storage unit (120), and outputs the after-recording data to the speaker and the video data to the LCD, in parallel.

The second conversion unit (132) receives the path name from the reproduction unit (131), and, according to the relationship of the path name and numerical value shown in FIG. 4, generates a numerical value from the received path name by an operation using this relationship. Further, when an after-recording path name is generated by the reproduction unit (131), the second conversion unit (132) generates a path name for the after-recording data from the generated numerical value.

However, since the after-recording data path name has no relation to the numerical value which corresponds to the path names of the video data and audio data to undergo after-recording editing, the second conversion unit (132) generates the after-recording data path name from the after-recording ID using the same rules as for generating an ordinary audio data path name from a numerical value.

Therefore, theafter-recording data pathname generated will be of the form "D:¥PRGB$_1$B$_2$B$_3$B$_4$¥AUDb$_1$b$_2$b$_3$b$_4$.MOD".

The following is an explanation of the process for storing data in the storage unit (120).

Figure 10:
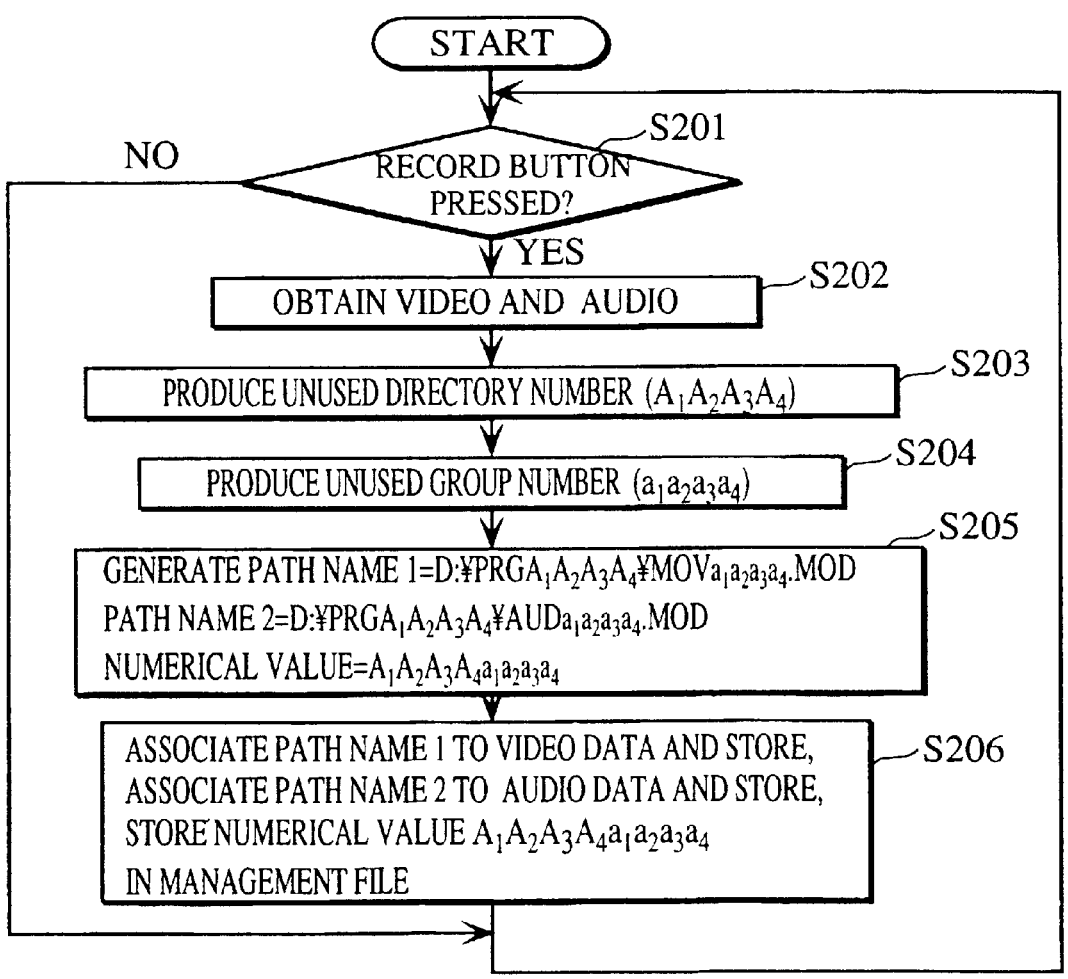
FIG. 10 is a flowchart showing the processing of data stored in the storage unit, i.e., recorded video and audio, in the video and audio processing apparatus according to the second embodiment.

FIG. 10 is a flow chart showing, according to the second embodiment, the process for storing data in the storage unit (120) of the video and audio processing apparatus (100), i.e., the process for recording video and audio.

The recording unit (111), by a signal from the operation switch, determines whether a command to record has been given (i.e., whether the record button has been pressed) (step S201). When a command to record has been received, the recording unit (111) receives video data and audio data from the CCD and microphone, and requests path names for these data from the character string generation unit (112).

In response to the request, the character string generation unit (112) refers to the data in the storage unit (120), generates an unused directory number, e.g., $A_1A_2A_3A_4$, and an unused group number, e.g., $a_1a_2a_3a_4$ (step S203, S204), and generates a path name 1 for the video data, "D:¥PRGA$_1$A$_2$A$_3$A$_4$¥MOVa$_1$a$_2$a$_3$a$_4$.MOD", a path name 2 for the audio data, "D:¥PRGA$_1$A$_2$A$_3$A$_4$¥AUDa$_1$a$_2$a$_3$a$_4$.MOD", and a numerical value representing these two path names, "$A_1A_2A_3A_4a_1a_2a_3a_4$" (step S205).

The preceding steps are the same as in the first embodiment.

Next, the recording unit (111) associates path name 1 and path name 2 to the video data and audio data, respectively, stores them in the storage unit (120), then stores the numerical value in the management file, i.e., "D:¥MGR_INFO¥PROG_MGR" in the storage unit (120) (step S206), and returns to the first step (S201), for determining whether a record command has been given by the recording unit (111).

There are no flags attached to the numerical values in the second embodiment.

Figure 11:
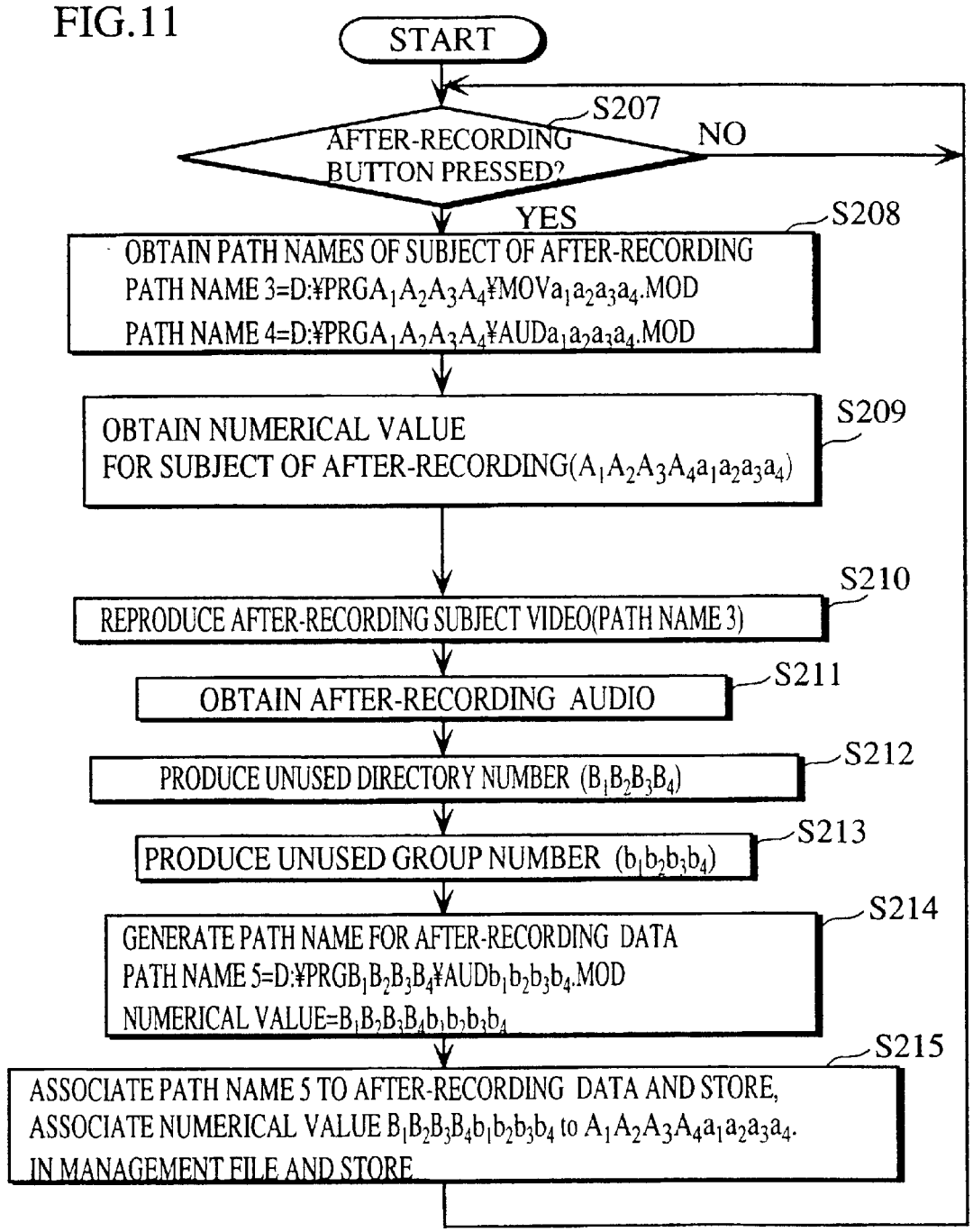
FIG. 11 is a flow chart showing the process for after-recording editing of recorded video and audio according to the second embodiment.

FIG. 11 is a flow chart showing the process for performing after-recording editing on video and audio recorded as described above.

When the reproduction unit (131) recognizes a command for after-recording editing by a signal from the operation switch (step S207), it begins the following process.

When an after-recording editing command is received, the reproduction unit (131) retrieves path name 3, "D:¥PRGA$_1$A$_2$A$_3$A$_4$¥MOVa$_1$a$_2$a$_3$a$_4$.MOD", for the video data which underwent after-recording editing, and path name 4, "D:¥PRGA$_1$A$_2$A$_3$A$_4$¥AUDa$_1$a$_2$a$_3$a$_4$.MOD", for the audio data (step S208).

Next, the second conversion unit (132) generates, by an operation an the path name indicating the storage location of the data which underwent after-recording editing, i.e., path name 3, the numerical value corresponding to path 4, i.e., A$_1$A$_2$A$_3$A$_4$a$_1$a$_2$a$_3$a$_4$ (step S209).

Next, the reproduction unit (131) reproduces the video data of path name 3, which underwent after-recording editing (step S210), and records the after-recording audio inserted during reproduction of the video data (step S211).

The preceding is the same as in the first embodiment.

Next, the recording unit (111) requests a path name from the character string generation unit (112) for the after-recording data.

In response to this request, the character string generation unit (112) refers to the data in the storage unit (120), generates an unused directory number, e.g., B$_1$B$_2$B$_3$B$_4$, and an unused group number, e.g., b$_1$b$_2$b$_3$b$_4$, (steps S212, S213) and generates path name 5, "D:¥PRGA$_1$A$_2$A$_3$A$_4$¥AUDa$_1$a$_2$a$_3$a$_4$.MOD", for the after-recording data, and a numerical value corresponding to this path name, i.e., B$_1$B$_2$B$_3$B$_4$b$_1$b$_2$b$_3$b$_4$ (step S214).

Next, the recording unit (111) associates path name 5 to the after-recording data, stores the path name in the storage unit (120), then associates the numerical value B$_1$B$_2$B$_3$B$_4$b$_1$b$_2$b$_3$b$_4$, which corresponds to the after-recording data path name, to the numerical value A$_1$A$_2$A$_3$A$_4$a$_1$a$_2$a$_3$a$_4$, which corresponds to the video data and audio data to undergo after-recording editing and exists in the management file "D:¥MGR_INFO¥PROG_MGR" in the storage unit (120), and stores B$_1$B$_2$B$_3$B$_4$b$_1$b$_2$b$_3$b$_4$ (step S215). Then, processing returns to the first step (S207), for determining whether an after-recording command has been accepted by the recording unit (111)

The following is an explanation of the process for retrieving data from the storage unit (120).

Figure 12:
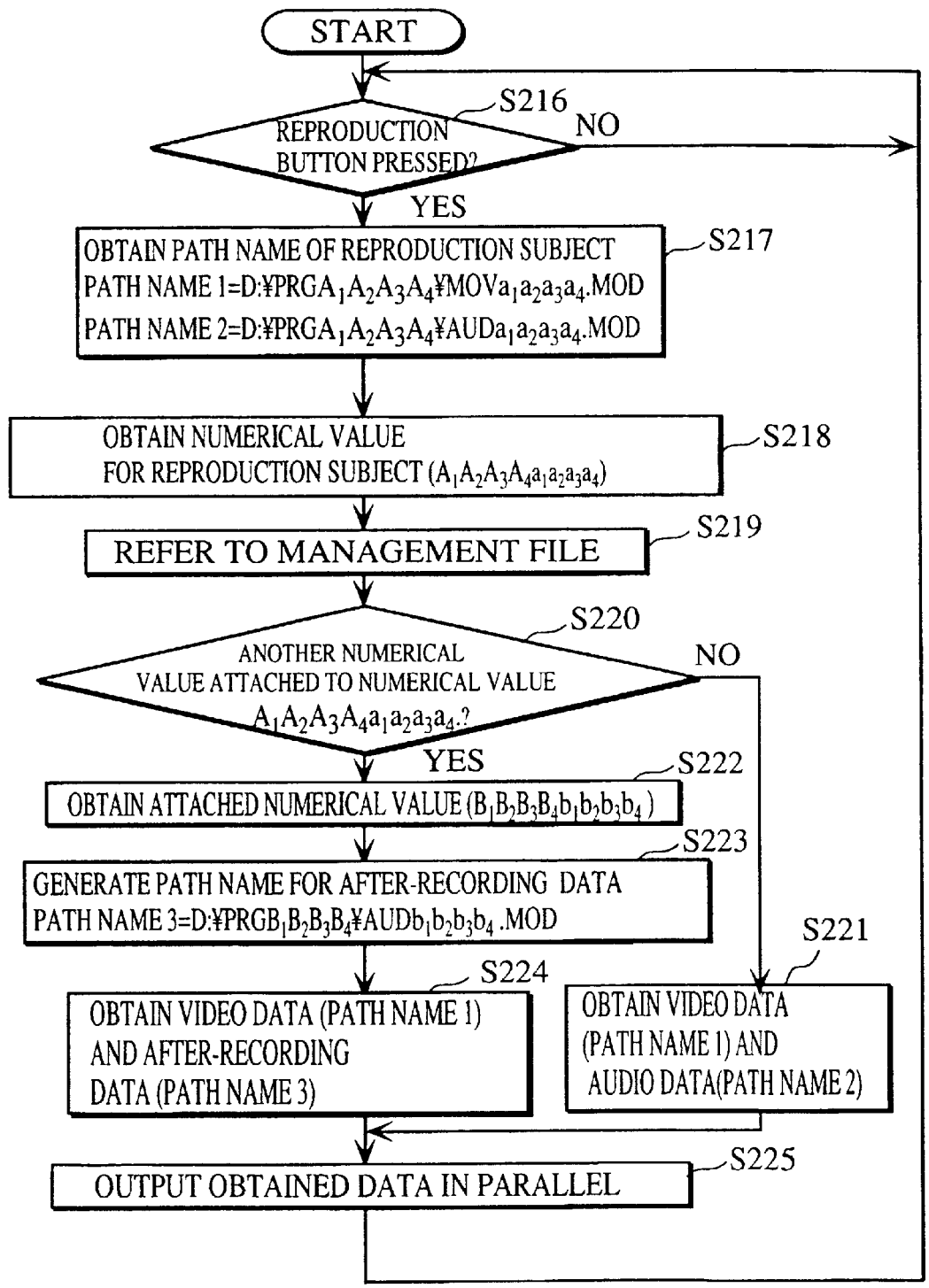
FIG. 12 is a flow chart showing the process for the data obtaining unit to retrieve data from the storage unit, i.e., operations for reproduction, according to the video and audio processing apparatus of the second embodiment.

FIG. 12 is a flow chart showing the operations of the data obtaining unit (130) for retrieving data from the storage unit (120), i.e., for reproduction, in the video and audio processing apparatus (100) of the second embodiment.

The reproduction unit (131) determines whether a command for reproduction has been given by a signal from the operation switch (i.e., whether the reproduction button is pressed) (step S216), and, if a reproduction command is received, begins the following process.

The reproduction unit (131) receives an indication of the path name of the data to be reproduced, e.g., path name 1 "D:¥PRGA$_1$A$_2$A$_3$A$_4$¥MOVa$_1$a$_2$a$_3$a$_4$.MOD", for video data, and path name 2 "D:¥PRGA$_1$A$_2$A$_3$A$_4$¥AUDa$_1$a$_2$a$_3$a$_4$.MOD", for audio data (step S217), and outputs path name 1 and path name 2 to the second conversion unit (132).

The second conversion unit (132) generates a numerical value, "A$_1$A$_2$A$_3$A$_4$a$_1$a$_2$a$_3$a$_4$", corresponding to the received path name 1 and path name 2, and outputs the numerical value to the reproduction unit (131) (step S218).

Next, the reproduction unit (131) refers to the management file in the storage unit (120) (step S219), and determines if another numerical value, i.e., an after-recording ID, is associated to the ID in the management file which corresponds to the numerical value received from the second conversion unit (132) (step S220)

If no after-recording ID is associated, the reproduction unit (131) retrieves the video data of path name 1 and the audio data of path name 2 from the storage unit (120) (step S221), outputs each retrieved data, i.e., video data and audio data or after-recording data, in parallel to the LCD and the speaker (step S225). Then, the process returns to the first step (S216), which determines whether a reproduction command has been given by a signal from the operation switch.

If, for example, a second after-recording ID, "B$_1$B$_2$B$_3$B$_4$b$_1$b$_2$b$_3$b$_4$", is associated to the after-recording ID, the reproduction unit (131) retrieves this second ID (step S222), directs the second conversion unit (132) to generate path name 3, "D:¥PRGB$_1$B$_2$B$_3$B$_4$¥AUDb$_1$b$_2$b$_3$b$_4$.MOD", from the second after-recording ID, retrieves path name 3 (step S223), and retrieves the path name 1 video data and the path name 3 after-recording data (step S224).

Next, the reproduction unit (131) outputs each retrieved data, i.e., video data and audio data or after-recording data, in parallel to the LCD and the speaker (step S225). Then, the process returns to the first step (S216), which determines whether a reproduction command has been given by a signal from the operation switch.

With the constructions and functions described above, a second numerical value, attached to a numerical value stored in the management file, can be used to indicate whether video data and audio data have undergone after-recording editing. Further, the second numerical value becomes the base for generating by a given operation, a path name which indicates the location of after-recording data. As a result, the volume of data needed for after-recording editing can be reduced.

In the first and second embodiments, the first conversion unit (113) and second conversion unit (132) generate numerical values from path names, and, similarly, the second conversion unit (132) generates path names for audio data from numerical values, according to the relationships shown in FIG. 4. However, path names may be generated from numerical values, and vice versa, based on a set of rules different from the traceability relationship between path name and numerical value shown in FIG. 4. For example, when generating a numerical value from a path name, a method of adding "1" to the numerical value generated from the path name by the relationship shown in FIG. 4 may be used to generate a different numerical value from the FIG. 4 process.

In this case, a path name would be generated from a numerical value by first subtracting "1" from the numerical value, then following the FIG. 4 process.

According to the first and second embodiments, the first conversion unit (113) generates a path name for after-recording data based on a provided numerical value. However, when a numerical value is provided, a path name for the video data or audio data corresponding to the numerical value, or another path name not described here may be produced.

In this case, the reproduction unit (131) would, using the path name of the video or audio data as a key, obtain the appropriate data, if it exists, from the storage unit (120).

In the second embodiment, the character string generation unit (112) makes no distinction between ordinary audio data recorded in parallel with video data and after-recording data, generating path names which include the fixed notation "AUD" for files containing either kind of audio data. However, the character string generation unit (112) may be set up to generate path names with distinct fixed notations, for example, "D:¥PRG0001¥SEP0001.MOD" as a path name for a file containing ordinary audio data, and "D:¥PRG0001¥AUD0001.MOD" as a path name for a file containing after-recording data.

In the first embodiment as described above, upon receiving a request from the recording unit (111) for a path name for an ordinary recording, other than after-recording, the character string generation unit (112) refers to data inside the storage unit (120), generated unused path names, e.g., "D:¥PRG0001¥MOV0001.MOD" and "D:¥PRG0001¥AUD0001.MOD", for the video data and audio data, and the recording unit (111) stores the data in the corresponding files. However, when after-recording editing has not been performed, the character string generation unit (112) may generate one path name, e.g., "D:¥PRG0001¥MOV0001.MOD", and the recording unit (111) may interleave and store the video data and audio data together in a single file.

In this case, when after-recording editing is performed, the character string generation unit (112) would generate a path name, e.g., "D:¥PRG0001¥AUD0001.MOD", and the recording unit (111) would store the after-recording data in the file corresponding to this path name.

That is, when only the path name "D:¥PRG0001¥MOV0001.MOD" exists, after-recording editing has not been performed, and when both path names "D:¥PRG0001¥MOV0001.MOD" and "D:¥PRG0001¥AUD0001.MOD" exist, after-recording editing has been performed.

In the first and second embodiments, numeral portion 1 and numeral portion 2 of a data path name each comprises four digits, and numerical values generated from them each comprises eight digits. However, the number of digits of numeral portion 1 and numeral portion 2 may be any number, e.g., three digits each, provided the total number of digits of the two portions does not exceed the number of digits of the numerical value generated by the first conversion unit (113).

In this case, the total number of digits of numeral portion 1 and numeral portion 2 could be less than the number of digits of the numerical value generated from them, but, by storing a fixed value for some digits of the generated numerical value and avoiding use of these digits for path name generation, conversion between path names and numerical values is possible without issue.

In this sort of situation, for example, if the numerical value obtained from converting numeral portion 1 and numeral portion 2 into 32-bit hexadecimal values by the first conversion unit (113) has eight digits, and if numeral portion 1 and numeral portion 2 each has only three digits, then each will have eight bits unused, so bits may be included for distinguishing other types of files, e.g., information indicating whether a file is encoded or not.

In the first embodiment, when the path name for video data to undergo after-recording is indicated by the recording unit (111), and a path name for after-recording data is requested, the character string generation unit (112) will generate a path name for the after-recording data which has "AU" substituted for "MOV" in the indicated path name. However, the path name for audio data to undergo after-recording may be indicated, and a path name for the after-recording data generated from this audio data path name.

Industrial Applicability

The data holding apparatus, data obtaining apparatus, data holding method and data obtaining method of the present invention are especially suited for use in (1) an apparatus and a method for recording data, using a file system to identify the location of data from a path name, and (2) an apparatus and a method for retrieving recorded data, using the system. The storage medium of the present invention is especially suited for storing data using a file system as described above.

What is claimed is:

1. A data obtaining apparatus for retrieving a desired data file from a storage unit storing a plurality of data files and address information indicating a path of each data file, the address information of each data file being denoted as a numerical value derived from a given partial notation of a name of the path, and a data size of the numerical value being smaller than a data size of a character string of the path name denoting the same address information, the data obtaining apparatus comprising:

a conversion unit operable to designate, from among the numerical values held in the storage unit, a numerical value corresponding to a data file to be retrieved, and operable to generate a character string for a path name, by performing a given operation to combine a given character string with a character string converted from the designated numerical value; and a reproduction unit operable to, if is a data file with the path name generated by the conversion unit is in the storage unit, retrieve the data file.

2. The data obtaining apparatus claimed in claim 1, wherein
the conversion unit is operable to generate a character string for each of a plurality of different path names.

3. The data obtaining apparatus claimed in claim 2, wherein
the conversion unit is operable to designate a base n numerical value, where n is an integer greater than one, and
the given operation performs the combination by inserting a character corresponding to the base n numerical value into each position in the generated character string.

4. The data obtaining apparatus claimed in claim 3, wherein
the conversion unit is operable to, when a first numerical value of a the numerical values held in the storage unit is associated with a distinct second numerical value, designate the first and second numerical values as corresponding to the data file to be retrieved, and
the reproduction unit retrieves a data file whose path name is generated from the second numerical value and includes a character string, that is generated from the first numerical value.

5. The data obtaining apparatus claimed in claim 3, wherein
at least one of the numerical values held in the storage unit has a flag of a first value or a distinct second value,
the conversion unit is operable to generate a plurality of character strings including a first character string,
the conversion unit is operable to, when the designated numerical value is the numerical value having the flag and flag shows the second value, generate a second character string, distinct from the first character string, and the reproduction unit is operable to retrieve a data file whose path name includes the second character string, in place of a data file whose path name includes the first character string.

6. The data obtaining apparatus as claimed in claim 5, wherein the second character string is the first character string with one or more characters deleted.

7. The data obtaining apparatus as claimed in claim 5, wherein the second character string is the first character string with one or more characters changed.

8. A data holding apparatus for storing a data file in a storage unit, the data holding apparatus comprising:

a recording unit operable to retrieve at least one data file, a character string generating unit operable to generate and allocate a path name for the data file; and a conversion unit operable to perform a given operation to generate, as address information corresponding to the path name, a numerical value having a data size that is smaller than a data size of the path name from a given partial notation that is part of the path name, wherein the recording unit is operable to store the numerical value and the data file associated with the path name identifying a location of the data file in the storage unit, the character string generating unit is operable to link two character strings of a directory name and a file name, respectively, that are used for data management, to generate the path name of the data file, the character string of the directory name comprises a unique character string and a base n first numeral string, where n is an integer greater than one, the character string of the file name comprises a given character string, which indicates a type of file, and a base n second numeral string, where n is an integer greater than one, and the conversion unit is operable to generate the numerical value by linking the first and second numeral strings as the given partial notation.

9. A data obtaining method for retrieving a desired data file from a storage unit storing a plurality of data files and address information indicating a path of each data file, the address information of each data file being denoted as a numerical value derived from a given partial notation of a name of the path, and a data size of the numerical value being smaller than a data size of a character string of the path name denoting the same address information, the data obtaining method comprising:

designating a numerical value from among the numerical values stored in the storage unit as corresponding to a data file to be retrieved;

generating a character string for a path name, by performing a given operation to combine a given character string with a character string that is converted from the designated value; and if there is a data file with the path name generated by the generating operation in the storage unit, retrieving the data file.

\* \* \* \* \*

UNITED STATES PATENT AND TRADEMARK OFFICE
CERTIFICATE OF CORRECTION

PATENT NO. : 6,754,649 B2
DATED : June 22, 2004
INVENTOR(S) : Kazuya Fujimura

It is certified that error appears in the above-identified patent and that said Letters Patent is hereby corrected as shown below:

Title page,
Item [57], ABSTRACT, please change "configuration which occupies" to
-- configuration occupies --.

Column 18,
Line 17, please change, "if is a data file" to -- if a data file --.
Line 4, please change, "value of a the" to -- value of the --.

Signed and Sealed this

Fifth Day of October, 2004

JON W. DUDAS
*Director of the United States Patent and Trademark Office*